US 10,726,535 B2

United States Patent
Chung et al.

(10) Patent No.: US 10,726,535 B2
(45) Date of Patent: Jul. 28, 2020

(54) AUTOMATICALLY GENERATING IMAGE DATASETS FOR USE IN IMAGE RECOGNITION AND DETECTION

(71) Applicant: Element AI Inc., Montreal (CA)

(72) Inventors: Wonchang Chung, Montreal (CA); Mathieu Marquis Bolduc, St. Laurent (CA); Francis A. Duplessis, Montreal (CA); Jeffrey Rainy, Montreal (CA)

( * ) Notice: Subject to any disclaimer, the term of this patent is extended or adjusted under 35 U.S.C. 154(b) by 92 days.

(21) Appl. No.: 15/912,407

(22) Filed: Mar. 5, 2018

(65) Prior Publication Data

US 2019/0272627 A1 Sep. 5, 2019

(51) Int. Cl.
| | |
|---|---|
| *G06T 7/00* | (2017.01) |
| *G06K 9/46* | (2006.01) |
| *G06N 20/00* | (2019.01) |
| *G06F 16/583* | (2019.01) |

(52) U.S. Cl.
CPC .......... *G06T 7/0004* (2013.01); *G06F 16/583* (2019.01); *G06K 9/46* (2013.01); *G06N 20/00* (2019.01); *G06T 2207/20081* (2013.01)

(58) Field of Classification Search
CPC ......... G06T 7/0004; G06T 2207/20081; G06T 7/0006; G06T 2207/30148; G06T 7/33; G06F 16/583; G06F 17/5045; G06N 20/00; G06K 9/46; G01N 21/9501; H01L 21/67288; H01L 21/67005
See application file for complete search history.

(56) References Cited

U.S. PATENT DOCUMENTS

| | | | | |
|---|---|---|---|---|
| 2007/0179740 A1* | 8/2007 | Bell | ................... | G01N 21/9501 702/166 |
| 2007/0230770 A1* | 10/2007 | Kulkarni | ............. | G06F 17/5045 382/149 |
| 2018/0253866 A1* | 9/2018 | Jain | ........................ | G06K 9/628 |

* cited by examiner

*Primary Examiner* — Jianxun Yang
(74) *Attorney, Agent, or Firm* — Brion Raffoul

(57) ABSTRACT

Systems and methods relating to image processing and artificial intelligence. Given a small number of defect images, a multitude of other defect images can be generated to serve as training data sets for training artificially intelligent systems to recognize and detect similar defects. Given original images showing defects, a clean image of the background of the original images is created. The defect image is then isolated from each of the original images. The characteristics of each defect image are determined and characteristics of similar defects are also determined, either from other images or from subject matter experts. Based on these characteristics of similar defects, multiple other defect images are then generated. The generated defect images are combined with the clean image to result in defect images with a suitable background. Each of the resulting images can be used in training systems in recognizing and detecting defects.

19 Claims, 8 Drawing Sheets

AUTOMATICALLY GENERATING IMAGE DATASETS FOR USE IN IMAGE RECOGNITION AND DETECTION

TECHNICAL FIELD

The present invention relates to image processing and computer vision. More specifically, the present invention relates to the generation of image data sets that can be used in training systems for defect detection.

BACKGROUND

The digital revolution of the past few years has led to the use of digital technology in most areas. Automated manufacturing has given rise to faster, more efficient machines and better quality goods. As part of automated manufacturing, robots and machines are now able to perform quality assurance testing. Goods automatically manufactured can be inspected by machines faster than a human can and with better accuracy. However, one issue with this is that such machines need to be properly programmed or "trained" to find defects and issues with the manufactured goods.

Automated quality assurance testing to spot defects in manufactured goods is a combination of using computer vision and pattern recognition as well as artificial intelligence. In one type of quality assurance testing, computer vision systems would use digital cameras to inspect the relevant surfaces of manufactured goods.

Any blemishes and/or surface imperfections would be detected and the QA system would determine if the imperfection is a defect in the manufactured good or not. To determine if a defect has been found, the system would need to be "trained" to recognize defects and this can be done by using AI and pattern recognition to differentiate between known defects, defects previously encountered, and a simple imperfection. (Of course, depending on the industry, any imperfection might be considered as a defect. As an example, in the microprocessor manufacturing industry, any imperfection on the manufactured die would be considered a flaw or a defect.)

To train such systems, especially when AI is being used for pattern recognition, it is usual to provide the system with a large number of examples of previously encountered manufacturing defects. The system then "learns" to recognize images of defects in much the same way that current image recognition systems learn to recognize human faces in digital images. Thus, since defects come in all shapes, sizes, and types, to be able to recognize a specific type of defect, large numbers of images of that type of defect is preferably available. These images of that type of defect are then presented to the system as training data. The system's logic (whether implemented as a convolutional neural network or as some other form of artificial intelligence) then learns to recognize that type of defect in the images.

Current systems are suitable for the above described manufacturing methods and QA processes. However, there are some defects that can be quite rare and, because of their rarity, not a lot of images of these defects are available. Because of the paucity of such images, current systems are either unable to be trained to detect such defects or, more commonly, such systems are improperly trained. Improperly trained systems would therefore not recognize such defects, leading to issues with the finished product.

Based on the above, there is therefore a need for systems and methods which would allow for such current systems to be properly trained in the detection and recognition of such rare defects.

SUMMARY

The present invention provides systems and methods relating to image processing and artificial intelligence. Given a small number of defect images, a multitude of other defect images can be generated to serve as training data sets for training artificially intelligent systems to recognize and detect similar defects. Original images showing defects can be used to generate training data sets. A clean image of the background of the original images is created. The defect image is then isolated from each of the original images. The characteristics of each defect image are determined and characteristics of similar defects are also determined, either from other images or from subject matter experts. Based on these characteristics of similar defects, multiple other defect images are then generated. The generated defect images are combined with the clean image to result in suitable defect images with a suitable background. Each of the resulting images can then be used as part of a training data set for training AI systems in recognizing and detecting defects illustrated in images.

In one aspect, the present invention provides a method for generating image data sets from an original image, said original image having a specific feature of interest within said original image, the method comprising:
  a) receiving said original image;
  b) obtaining a clean image, said clean image being an image similar to said original image but not including said specific feature of interest;
  c) subtracting said clean image from said original image to result in a feature image, said feature image comprising an extracted version of said specific feature of interest from said original image;
  d) determining characteristics of said specific feature of interest from said feature image;
  e) determining characteristics of features of interest similar to said specific feature of interest;
  f) generating new feature images based on characteristics determined in steps d) and e);
  g) combining said new feature images and said clean image to result in said new image data sets;
wherein said new image data sets are used in image recognition and detection.

In another aspect, the present invention provides a method of generating additional digital image data sets from at least one original digital image of a manufacturing defect, the method comprising:
  a) extracting a section of a background of said at least one original image, said section of a background not including any pixels showing said manufacturing defect;
  b) creating a clean image from said section extracted in step a);
  c) extracting at least one defect section from said at least one original image, said defect section including only pixels showing said manufacturing defect;
  d) determining characteristics of said manufacturing defect shown in said defect section;
  e) generating other defect sections showing other possible manufacturing defects based on said characteristics determined in step d) and possible characteristics of other manufacturing defects similar to said manufacturing defect shown in said at least one original defect; and f) combining said other defect sections with said clean image to result in multiple images of possible manufacturing defects.

Yet a further aspect of the present invention provides computer readable media having encoded thereon computer readable and computer executable instructions that, when executed, implements a method for generating image data sets from an original image, said original image having a specific feature of interest within said original image, the method comprising:

a) receiving said original image;
b) determining a location of said specific feature of interest in said original image;
c) selecting a section of a background of said original image, said section of said background not including said specific feature of interest;
d) extracting said section of said background;
e) creating a clean image from said section of said background, said clean image being created by tiling said section extracted in step d) to result in said clean image;
f) subtracting said clean image from said original image to result in a feature image, said feature image comprising an extracted version of said specific feature of interest from said original image;
g) determining characteristics of said specific feature of interest from said feature image;
h) determining characteristics of features of interest similar to said specific feature of interest;
i) generating new feature images based on characteristics determined in steps g) and h);
j) combining said new feature images and said clean image to result in said new image data sets;

wherein said new image data sets are used in image recognition and detection.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
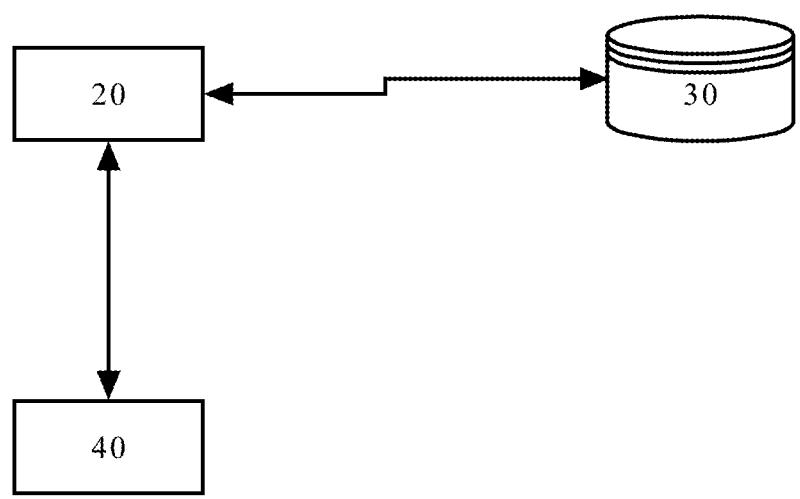
FIG. 1 is block diagram of a system which may be used to practice the invention.

In one aspect, the present invention provides a method for automatically generating additional digital images for use in training systems for automatic defect detection and recognition from one or more original images of such defects. Referring to FIG. 1, a block diagram of a system that the invention can be practiced on is illustrated. The system 10 has a processor 20, storage 30, and, preferably, a display 40. The system receives an original image having a specific feature of interest (e.g. a defect) and processes that original image. The specific feature of interest is, preferably, centered, extracted, and saved as a feature image (i.e. an image of the feature of interest). In one implementation, a section of the background of the original image (i.e. the background being pixels of the original image and not including any pixels of the specific feature of interest) is extracted. This section is then tiled and replicated multiple times to result in a clean image of the background.

Once the clean image has been created or obtained, and once the feature image has been isolated, the characteristics of the specific feature of interest are then determined. Characteristics of similar features (i.e. similar defects) can then be added to a list of the characteristics. Based on these characteristics and based on randomly generated characteristics, images of similar features can then be generated. Once generated, these new feature images can then be combined to result in new images that can be used in data sets for training AI systems in defect recognition and detection.

Figure 2:
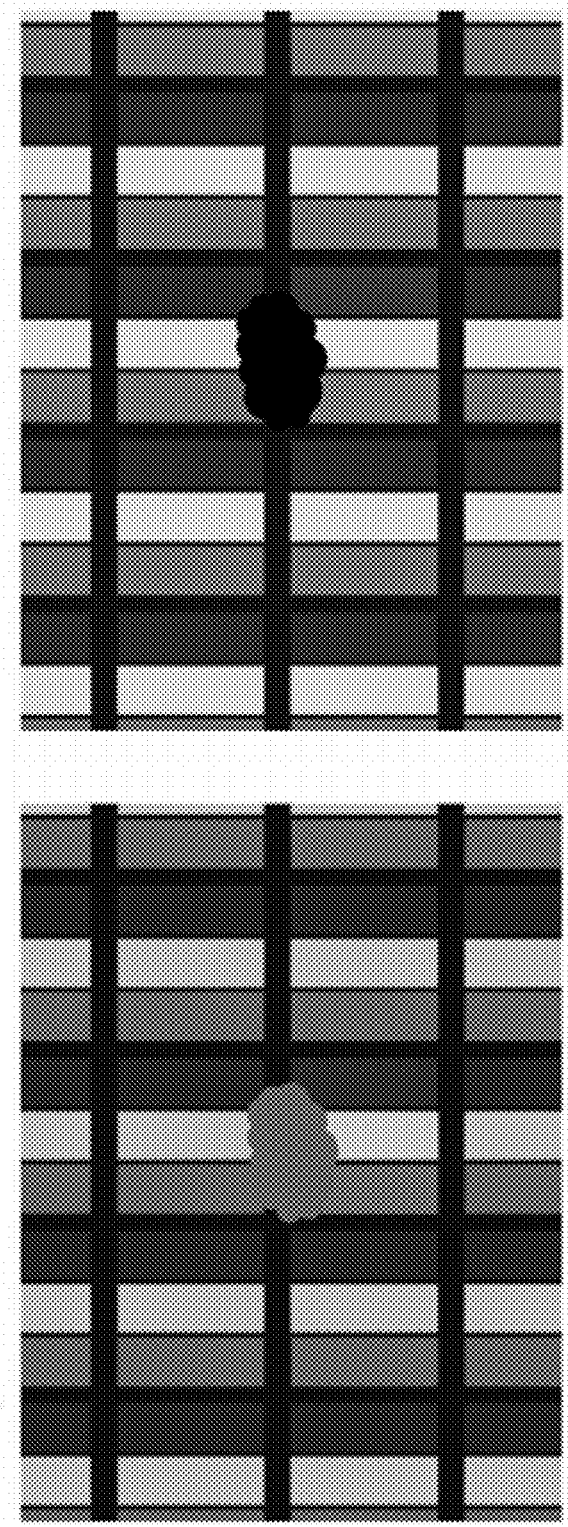
FIG. 2 illustrates two original images having specific features of interest (manufacturing defects in this example)

Referring to FIG. 2, two original images of the same manufacturing defect is illustrated. The left image is a transparent image of the feature of interest while the right image is a reflective image of the defect. It should be clear that multiple images of the same defect or feature of interest may be used as the process is similar regardless of the type of original image used.

For clarity, the images provided as examples are for a display unit. Transparent images, in the context of the example images, are images where a backlight is on and with no ambient light. The transparent images in the Figures are in rich colors while the reflective images look like black and white images. It should also be clear that reflective images are those taken with the backlight off and with ambient light reflecting on the display. These types of images are only provided as examples and other types of images may also be used with the present invention.

Prior to processing the original image, the feature or the defect in the original image can first be located within the image and, preferably, centered within the image. Centering the feature would simplify later processing.

Figure 3:
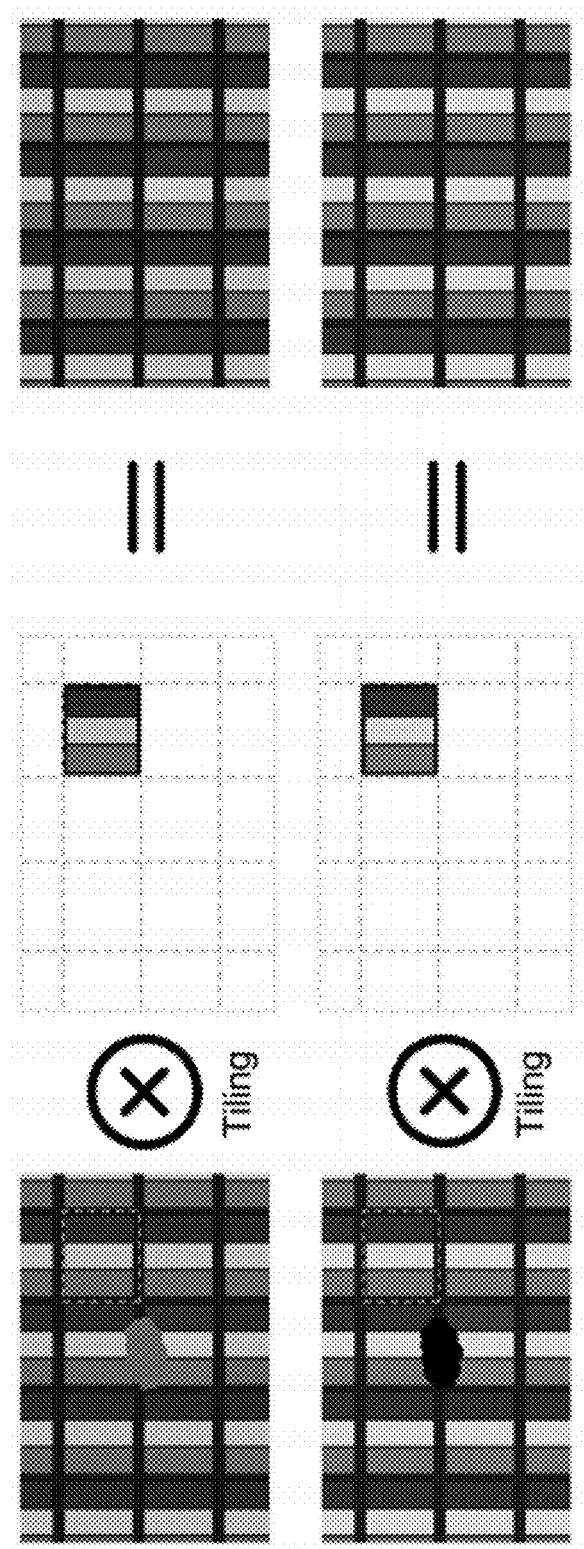
FIG. 3 illustrates a step in one aspect of the present invention, that of generating a clean image from extracted sections of the original image.

Once the feature has been located and centered in the original image, a section of the background of the original image is then isolated and extracted (see FIG. 3). The background is the part of the original image that does not include any pixels that display any part of the feature or defect. As can be seen in FIG. 3, a small section to the upper right of the defect is isolated and extracted. In this embodiment, the original image is divided into a grid and one grid that does not cover any part of the feature of interest is the background section to be extracted.

With the background section extracted, a gridded image is created and the extracted section is then replicated into each of the various grids in the gridded image. In other words, the section is tiled across the gridded image to result in a clean image, i.e. an image that does not include the feature or defect but which includes the background of the original image. In FIG. 3, the clean images from the transparent and reflective images are on the right side of the feature while the original images are on the left side of the Figure.

Regarding the size of the section extracted, the only limitation is the pixel size as well as the size of the feature. As long as the section extracted does not include any pixels that include any part of the feature, then the section can be used. Thus, the section extracted can be as large as necessary or it can be as small as a single pixel.

On the subject of a clean image, the above step outlines how a clean image can be obtained by extracting a section of the background and then tiling that section to result in a clean image without the defect. However, for images with a non-uniform background, a clean image may be obtained by merely using an image of a similar section or area of the manufactured device that does not have the defect. As an example, if one manufactured device has a specific defect in one part, another instance of the same device may not have such a defect. An image of the non-defect area of the non-defect device can then be used as the clean image. This clean image can then be used as outlined below.

Figure 4:
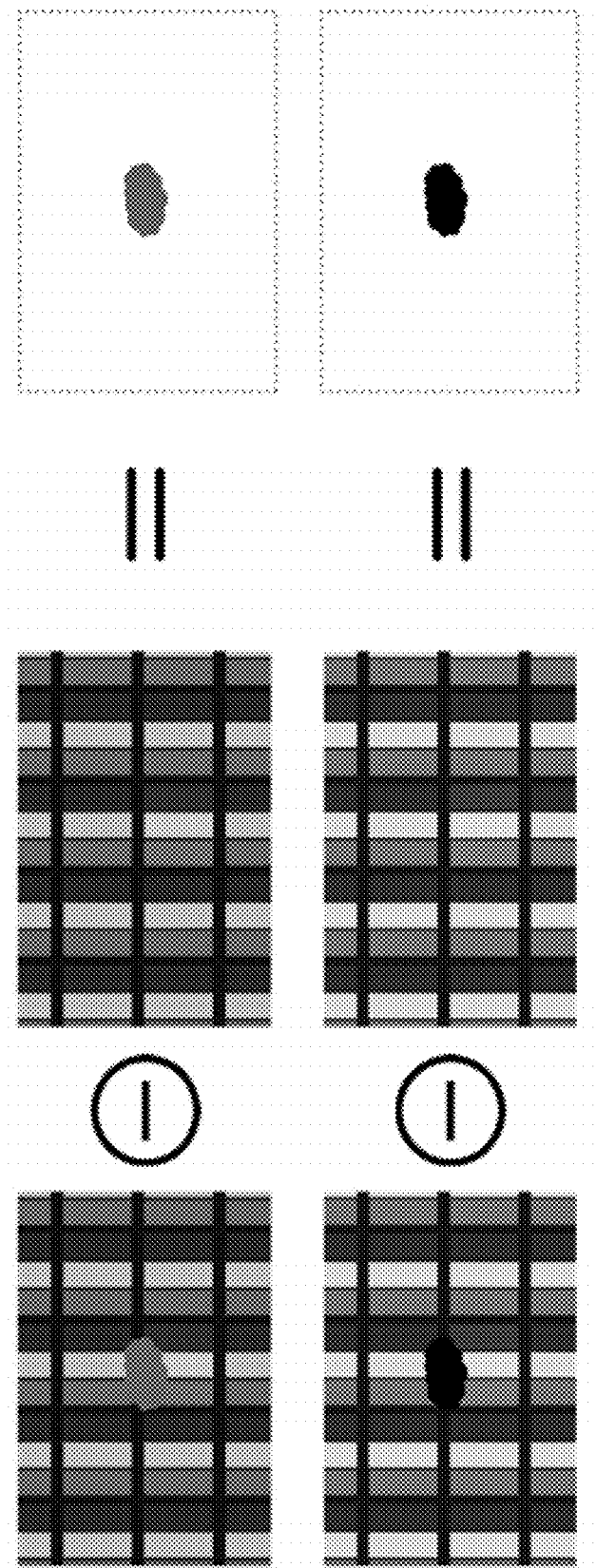
FIG. 4 illustrates another step in one aspect of the present invention, that of extracting the feature of interest from the original image.

The next step is to isolate the feature or defect from the original image. As can be seen from FIG. 4, this can be done with the help of the clean image generated or obtained previously. A simple image operation of subtracting the clean image from the original image results in a feature image that consists only of the feature or defect from the original image. Other steps to clean up or render more clearly the feature image (e.g. denoising the resulting feature image) may be carried out as well. Of course, other methods for extracting or isolating the feature or defect can also be used.

Figure 5:
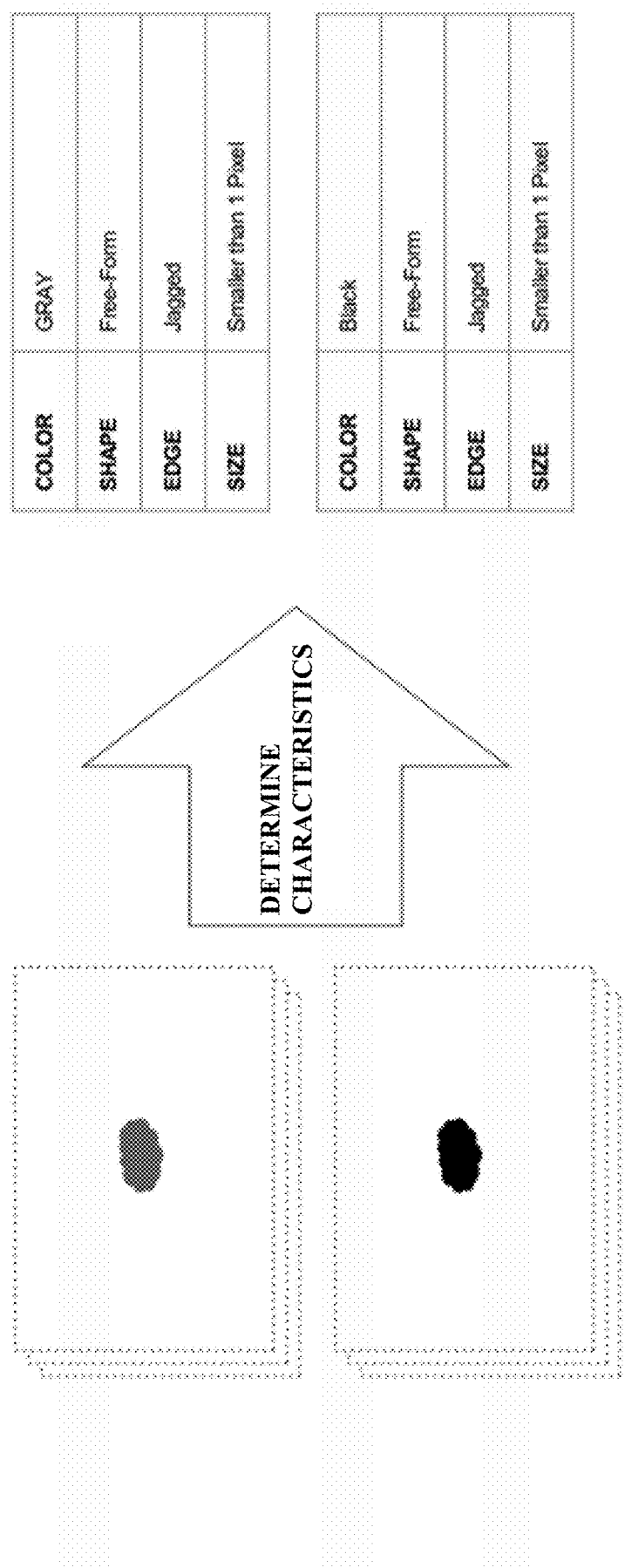
FIG. 5 schematically shows determining characteristics of the feature extracted in FIG. 4.

From the feature image, the characteristics of the features (i.e. the defects in this example) can then be determined (see FIG. 5). Accordingly, the color, shape, type of edges of the feature (i.e. edge style), direction, the size of the feature (relative to the pixel size in this example), as well as other characteristics, can be found. A suitable process for extracting specific characteristics about the feature can be formulated by a person of skill in the art. It should be clear that such a process may include specifically detailing the characteristics being extracted or determined. Thus, the characteristics may be specific to the type of original image being used (e.g. if it is a reflective image, the color may be "thin" such that it looks like a black and white image while an original transparent image may have a full spectrum of available colors) as well as the scale of the original image (e.g. if the original image is large, then the scale of the feature may be based on a scale different from a pixel scale). Of course, if multiple feature images are available (i.e. multiple original images are being used), this list of characteristics may be lengthy with each feature image having its own list of characteristics. For such an embodiment, all the various characteristics from all of the multiple feature images from the various original images are collated into a single characteristic list. Of course, the single characteristic list would only be compiled if all of the original images are of features that are of the same type, class, configuration, or even orientation as desired by the user.

The list of characteristics for the feature can be, once compiled, added to using other known characteristics. These other characteristics can be from a known database or from human experts in the field. Similarly, the other characteristics may have been previously compiled from other source or original images. These other characteristics are added to the list compiled in the previous step.

With the list of characteristics compiled, the system can then generate multiple feature images based on the characteristics in the characteristic list. The characteristics may be divided into a number of categories, with necessary categories being marked as such while optional categories are equally marked as such. The system would then select one characteristic from each of the necessary categories and, depending on the configuration of the system, one or more characteristics from optional categories. These selected characteristics would then be used as the basis for an automatically generated feature image. Of course, the resulting feature image would have the characteristics as selected from the various categories.

Figure 6:
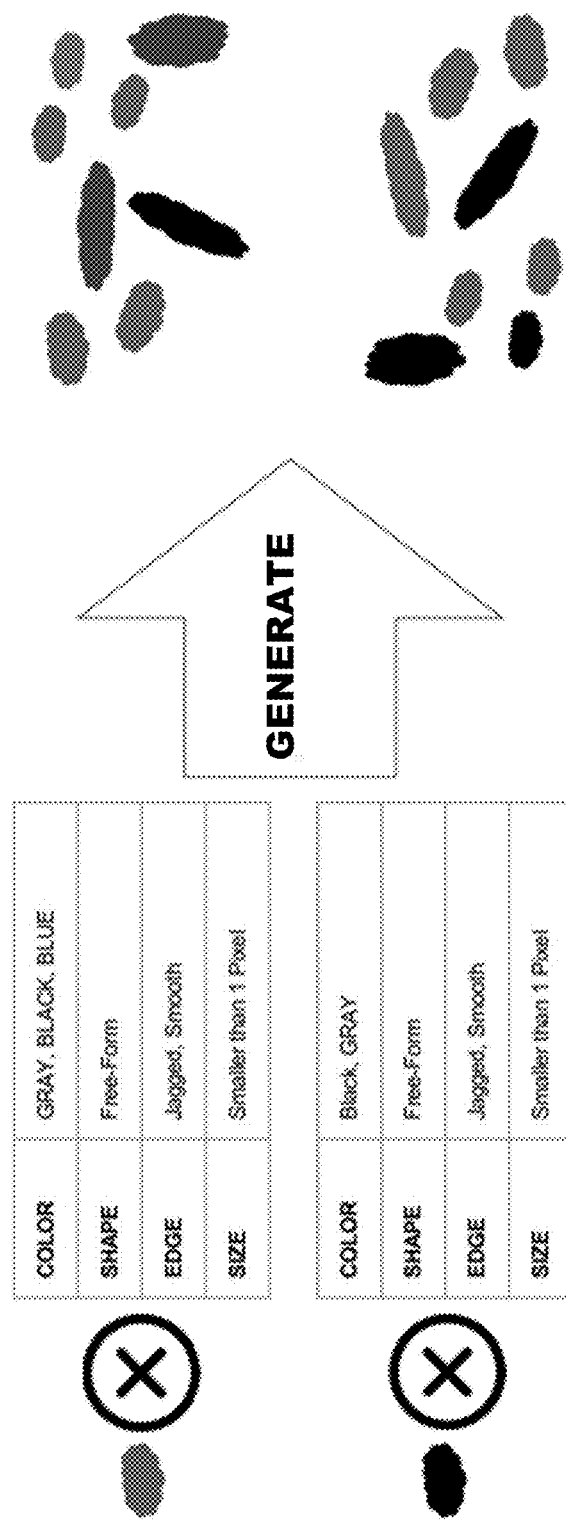
FIG. 6 schematically shows the synthesis or generation of new feature images based on the characteristics of the feature of interest.

(See FIG. 6) As an example from FIG. 6, a feature image generated from the list of characteristics might have a color that is black, a free form shape, a smooth edge, and a size that is smaller than one pixel. It should be clear that, depending on the desired size of the data set for training, multiple feature images can be generated. As an example, if there are 5 necessary categories (and no optional categories) and each category lists four different characteristics, then, theoretically, there are a total of 4×4×4×4×4=1024 possible feature images that can be generated. These various feature images would, of course, only contain the artificially generated feature (e.g. a defect) with the characteristics automatically selected by the system.

One option for auto-generating a feature image with specific characteristics might be to use the original feature image. The feature image can be rotated to any suitable angle, elongated, shortened, or have its shape altered appropriately. Similarly, the feature image can have its color adjusted appropriately or have its shape rounded or sharpened to a suitable shape. Of course, these image adjustments can be made with reference to the characteristics selected as noted above.

As an added randomization feature, the various feature images may also be adjusted on the basis of random (i.e. Gaussian) noises. Thus, a Gaussian-based random element can be introduced into one or more of the feature images to ensure that not all the resulting feature images are necessarily deterministic.

Figure 7:
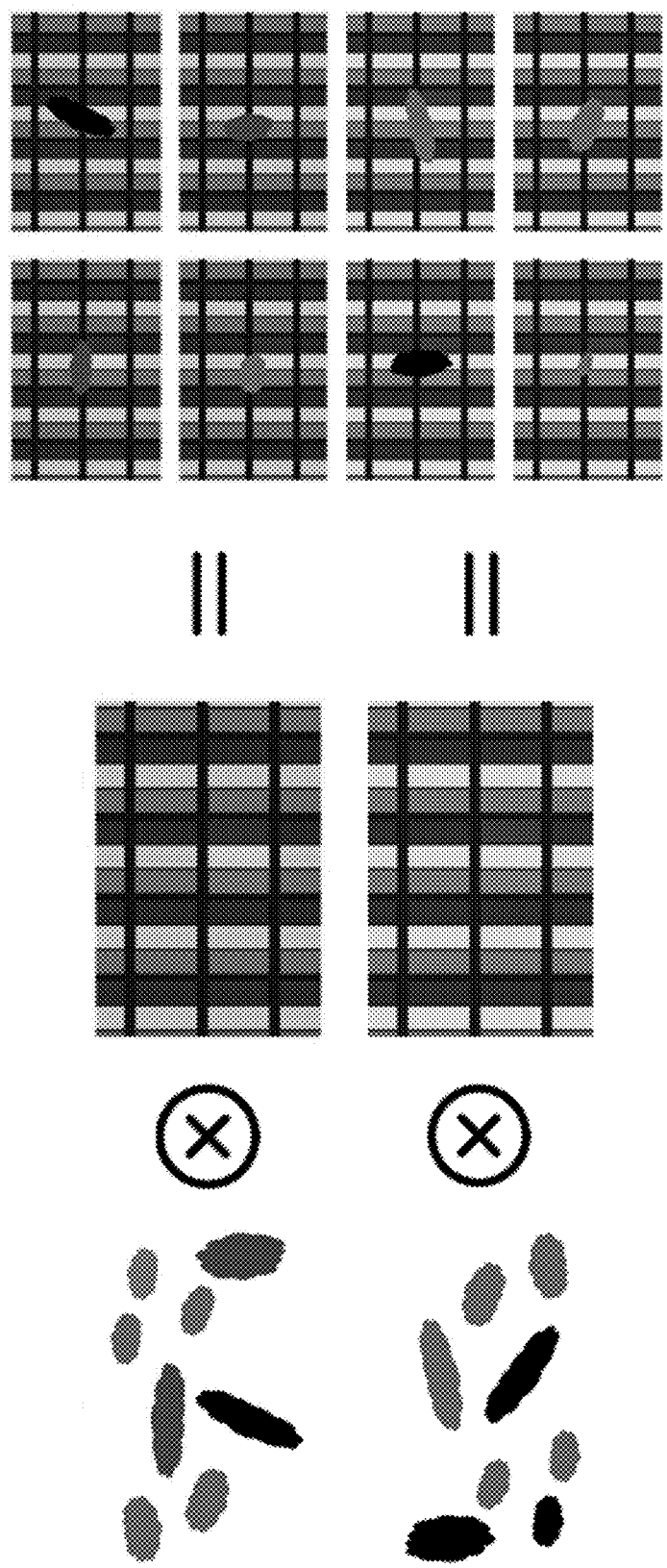
FIG. 7 shows the combination of the feature images generated in FIG. 6 with the clean image generated in FIG. 3.

Once the various feature images have been generated, each of the feature images can then be combined with the related clean image (see FIG. 7). Of course, if the feature image resulted from an original image that is a transparent image, the clean image derived from the original transparent image is used. Similarly, if the feature image resulted from the original image that is a reflective image, then the clean image derived from the original reflective image is used. By combining the various automatically generated feature images with the clean images, the resulting new image reflects the look of the original image. These new images (i.e. the combination of the new feature images and the relevant clean image) can then be combined into a new image data set. The new image data set can then be used to train artificial intelligence system (e.g. convolutional neural networks) for feature recognition and detection. For this example, since the features of interest in the original images were manufacturing defects, then the AI system can then be trained in defect detection and recognition from digital images. And, of course, the original images can also be added to the data set for such training. The resulting image data set can be used for training other types of neural networks, image classification software, as well as any other type of system that operates to recognize or detect an image/object. Similarly, the resulting image data set can be used in various forms of machine learning or artificial intelligence.

In addition to the above, the resulting data set may also be used to train classifier software so that certain defects and/or images can be properly classified and/or detected/recognized.

It should be clear that the above method can include other well-known steps as necessary and as known to those of skill in the art. As well, the method may be practiced on various system and using various types of images. As an example, RGB images, black and white, or grey scale original images may be used. Similarly, the feature images, the clean images and the resulting new images may be RGB, black and white, or grey scale images as necessary.

Figure 8:
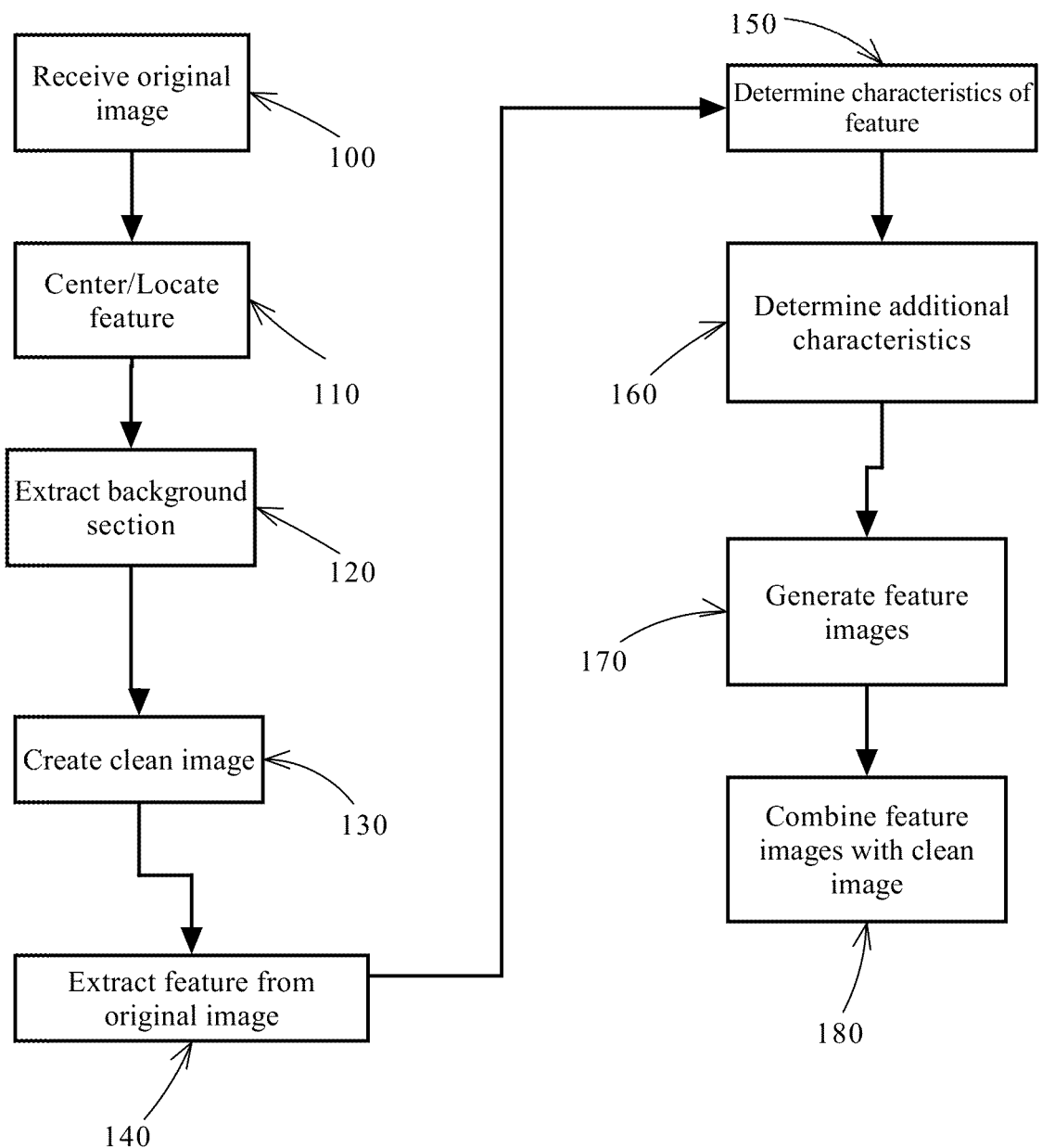
FIG. 8 illustrates a flowchart detailing the steps in a method of one aspect of the present invention.

The method detailed above can be outlined as shown in the flowchart in FIG. 8. The method begins at step 100, that of receiving the original image at the processor. The feature of interest (i.e. the defect in one embodiment) is then centered and/or located within the original image (step 110). A background section is then extracted (step 120) and this background section is used to create a clean image (step 130). The feature (i.e. the defect) is then extracted from the original image (step 140) and its characteristics determined (step 150). Additional characteristics for similar features can then be added to the characteristics list (step 160). Based on the augmented characteristics list (along with possibly some Gaussian noise parameter), numerous feature images are then generated (step 170). These generated feature images are then combined with the clean image to result in images which can be used for training.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for image manipulation comprising:
   a) receiving an original image, said original image including a specific feature of interest and said original image being a digital image;
   b) obtaining a clean image, said clean image being an image similar to said original image but not including said specific feature of interest, said clean image being a digital image and said clean image being derived from said original image;
   c) extracting a feature image from said original image, said feature image comprising an extracted version of said specific feature of interest from said original image;
   d) determining specific characteristics of said specific feature of interest from said feature image;
   e) generating new features of interest based on said specific characteristics determined in step d), said new features of interest being non-existent in said original image and said new features of interest having characteristics similar to said specific characteristics determined in step d);
   f) generating new feature images, each of said new feature images including at least one of said new features of interest and said new feature images being digital images; and
   g) combining said new feature images and said clean image to result in at least one new image data set, said at least one new image data set comprising at least one new digital image derived from a combination of said new feature images and said clean image, wherein said at least one new image data set is used in training artificial intelligence systems for automatic feature detection and recognition.

2. The method according to claim 1, wherein step f) comprises generating said new feature images based on Gaussian noise combined with said specific characteristics determined in step d) and with said characteristics of said new features of interest generated in step e).

3. The method according to claim 1, wherein said original image is a transparent image.

4. The method according to claim 1, wherein said original image is a reflective image.

5. The method according to claim 1, wherein said specific feature of interest is a defect in a manufacturing of a product.

6. The method according to claim 1, wherein said at least one new image data set is used to train image processing systems.

7. The method according to claim 6, wherein said image processing systems use machine learning.

8. The method according to claim 1, further including a step of denoising at least one of said feature image, said new image, and said clean image.

9. The method according to claim 1, wherein, in step e), said characteristics similar to said specific characteristics determined in step d) are retrieved from a database.

10. The method according to claim 1, wherein step b) comprises selecting a section of a background of said original image, said section of said background not including said specific feature of interest and extracting said section of said background.

11. The method according to claim 10, wherein step b) further comprises creating said clean image from said section of said background, said clean image being created by tiling said section previously extracted to result in said clean image.

12. The method according to claim 1, wherein step b) comprises obtaining a clean image as an image of a section of a manufactured product that does not include said specific feature of interest.

13. The method according to claim 1, wherein step c) comprises subtracting said clean image from said original image to result in said feature image.

14. A method for digital image manipulation comprising:
   a) extracting a section of a background of at least one original image of a manufacturing defect, said section not including any pixels showing said manufacturing defect, said original image being a digital image;
   b) creating a clean image from said section extracted in step a), said clean image being a digital image;
   c) extracting at least one defect section from said at least one original image, said defect section including only pixels showing said manufacturing defect;
   d) determining specific characteristics of said manufacturing defect shown in said defect section;
   e) generating images of new manufacturing defects based on said specific characteristics determined in step d), said new manufacturing defects being non-existent in said original image and said new manufacturing defects having characteristics similar to said specific characteristics determined in step d);
   f) generating new defect sections, each of said new defect sections including at least one of said images generated in step e); and
   g) combining said other defect sections with said clean image to result in multiple images of possible manufacturing defects,
       wherein said multiple images of possible manufacturing defects are used in training artificial intelligence systems for automatic feature detection and recognition.

15. The method according to claim 14, wherein step c) comprises subtracting said clean image from said at least one original image to result in said at least one defect section.

16. The method according to claim 14, wherein step f) further comprises using Gaussian noise in generating said new defect sections.

17. The method according to claim 14, further comprising repeating said method for said at least one original digital image.

18. The method according to claim 14, further including determining a location of said manufacturing defect within said at least one original image.

19. Non-transitory computer readable media having encoded thereon computer: readable and computer: executable instructions that, when executed, implement a method comprising:
   a) receiving an original image, said original image being a digital image;
   b) determining a location of a specific feature of interest in said original image;
   c) selecting a section of a background of said original image, said section of said background not including said specific feature of interest;
   d) extracting said section of said background;
   e) creating a clean image from said section of said background, said clean image being created by tiling said section extracted in step d) to result in said clean image, said clean image being a digital image;
   f) subtracting said clean image from said original image to result in a feature image, said feature image comprising an extracted version of said specific feature of interest from said original image;
   g) determining specific characteristics of said specific feature of interest from said feature image;
   h) generating new features of interest based on said specific characteristics determined in step d), said new features of interest being non-existent in said original image and said new features of interest having characteristics similar to said specific characteristics determined in step d);
   i) generating new feature images, each of said new feature images including at least one new feature of interest; and
   j) combining said new feature images and said clean image to result in said new image data sets,
wherein said new image data sets are used in training artificial intelligence systems for automatic feature detection and recognition.

* * * * *